United States Patent [19]

Schempp

[11] 4,160,117
[45] Jul. 3, 1979

[54] ARC FURNACE ENCLOSURE

[76] Inventor: Eberhard G. Schempp, 115 Kinross La., Pittsburgh, Pa. 15237

[21] Appl. No.: 841,344

[22] Filed: Oct. 12, 1977

[51] Int. Cl.² ............................................. F27D 23/00
[52] U.S. Cl. ............................................. 13/1; 432/64
[58] Field of Search .................. 13/1, 9 R, 10; 432/64, 432/65

[56] References Cited
U.S. PATENT DOCUMENTS 4,088,824   5/1978   Bonistalli ............................... 13/9 R Primary Examiner—R. N. Envall, Jr.

[57] ABSTRACT

An arc furnace enclosure has front, side and rear walls and a roof. A front opening in the enclosure allows a charging bucket to be moved into the enclosure and there is a roof opening for access to the furnace electrodes. A door assembly is movable into and out of a closed position to cover the front and top openings except for a gap which permits the charging bucket support hooks to extend from the enclosure so that the door assembly may be closed during charging. An air curtain seals the roof gaps and a vent withdraws gases and smoke from the enclosure.

4 Claims, 5 Drawing Figures

ARC FURNACE ENCLOSURE

BACKGROUND OF THE INVENTION

This invention relates to enclosures for electric arc furnaces.

Electric arc furnaces generally include a furnace body adapted to contain molten metal and a removable cover through which the arc furnace electrodes extend. Such furnaces are normally charged with metal in the form of scrap, hot metal or a combination of the two. In order to permit furnace charging, the furnace roof is pivoted away from the furnace body to permit the metallic charge to be delivered from a charging bucket or ladle supported on a crane thereabove. During the charging operation, a substantial quantity of smoke and other gases are released from the vessel. In addition, relatively high noise levels occur during the scrap charging, melting and pouring operations associated with an electric arc furnace.

While enclosures for electric arc furnaces are known, such as that shown in U.S. Pat. No. 3,913,898, such prior art enclosures have side and top wall openings which permit entrance and exit of the charging ladle and supporting crane from the enclosure. However, during the charging operation and while the empty charging bucket is being removed from the enclosure, the enclosure doors must remain open thus permitting a substantial quantity of smoke and other gases to escape and a substantial amount of noise to pass into other areas of the shop. Other prior art arc furnace enclosures merely provide a front access door and roof slots to permit the front doors to be closed during charging and ladle removal, such enclosures did not permit ready access to furnace electrodes.

SUMMARY OF THE INVENTION

It is an object of the invention to provide a new and improved arc furnace enclosure.

Another object of the invention is to provide an arc furnace enclosure which captures smoke, other gases and noise during the charging operation and while the charging bucket is being removed from the enclosure but which permits access to the furnace electrodes.

These and other objects and advantages of the present invention will become more apparent from the details thereof taken with the accompanying drawings.

DETAILED DESCRIPTION OF THE PREFERRED EMBODIMENT

Figure 1:
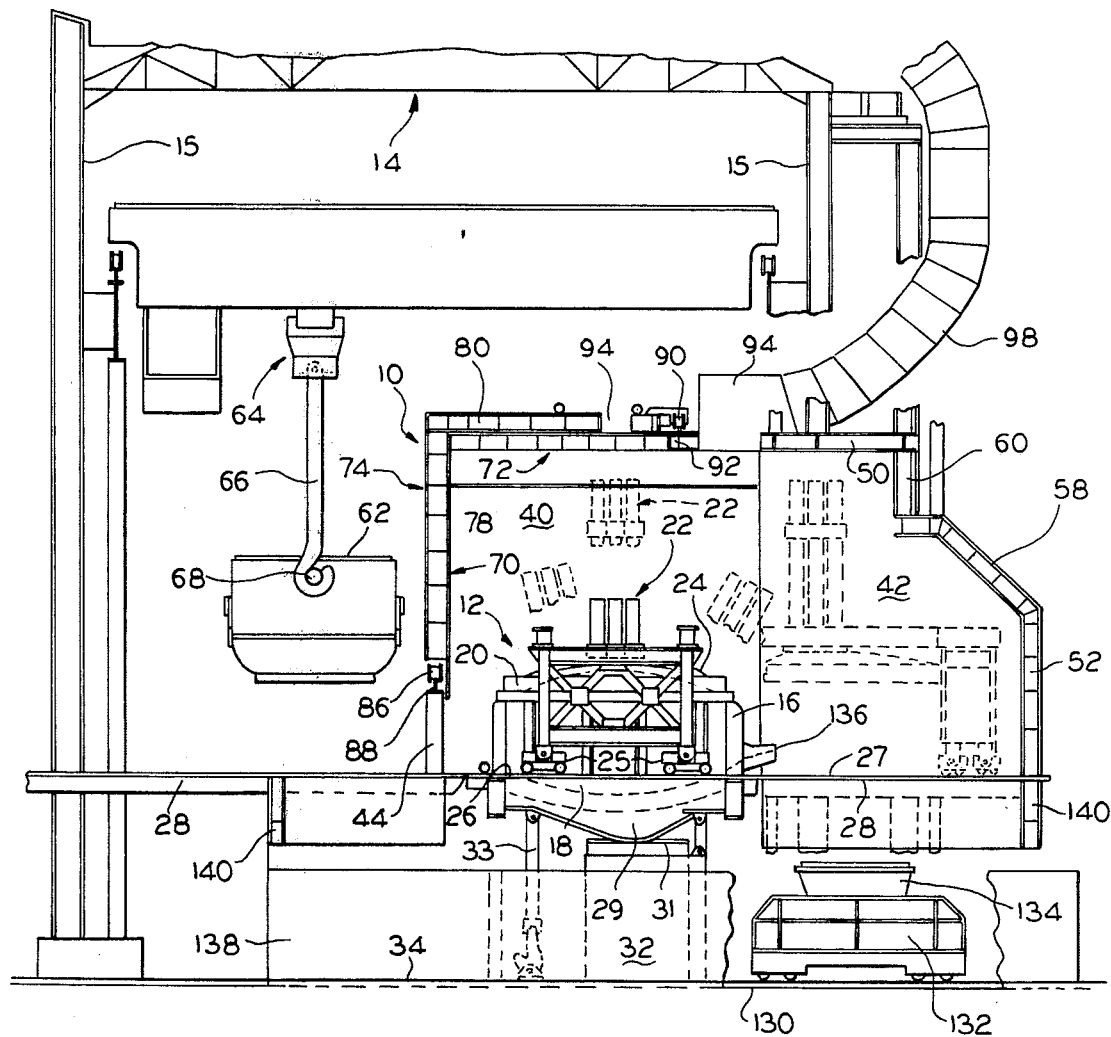
FIG. 1 is a side elevational view with parts broken away of an enclosure according to the present invention.

FIG. 1 shows an enclosure 10 according to the invention for housing an electric arc furnace 12. The enclosure 10 is preferably disposed within a larger building symbolized by a roof truss 14 and support columns 15.

The electric arc furnace may be of a conventional type and includes a furnace body 16 mounted on a platform 18, a furnace cover 20 and a plurality of electrodes 22 which extend through suitable openings in cover 20. It will be understood that the furnace body 16 is generally hollow and circular in plan view and includes a refractory lining (not shown) and a metallic shell. The roof 20 is supported by a gantry 24 for elevating the roof 20 and the electrodes 22 from the furnace body 16 and for swinging the same from their position shown by full lines in FIG. 1 to its position shown by broken lines so that the furnace may be charged. Specifically the gantry 24 is mounted on rollers 25 which are in turn mounted on rails 26 which extend across the platform 18 and, when the platform is in a horizontal position, are in alignment with additional rails 27 mounted on the work floor 28. Means (not shown) are provided for driving the rollers 25 across the rails 26 and 27 for moving the furnace roof 20 between its position shown by full lines and broken lines in FIG. 1 after suitable elevation thereof.

The platform 18 is mounted on a rocker assembly consisting of a pair of parallel arcuate rocker segments 29 mounted below platform 18 and a pair of spaced apart linear rocker segments 31 mounted on a support pier 32. The furnace body may be tilted between its position shown by full lines and its position shown by broken lines by means of a pair of hydraulic cylinders 33 which pivotally engage the furnace body 16 and the support floor 34.

For a more complete description of the gantry 24, the rocker assembly 29, 31 and the tilt cylinders 33, reference is made to copending application, Ser. No. 793,754, filed May 4, 1977, and assigned to the assignee of the present invention.

Figure 3:
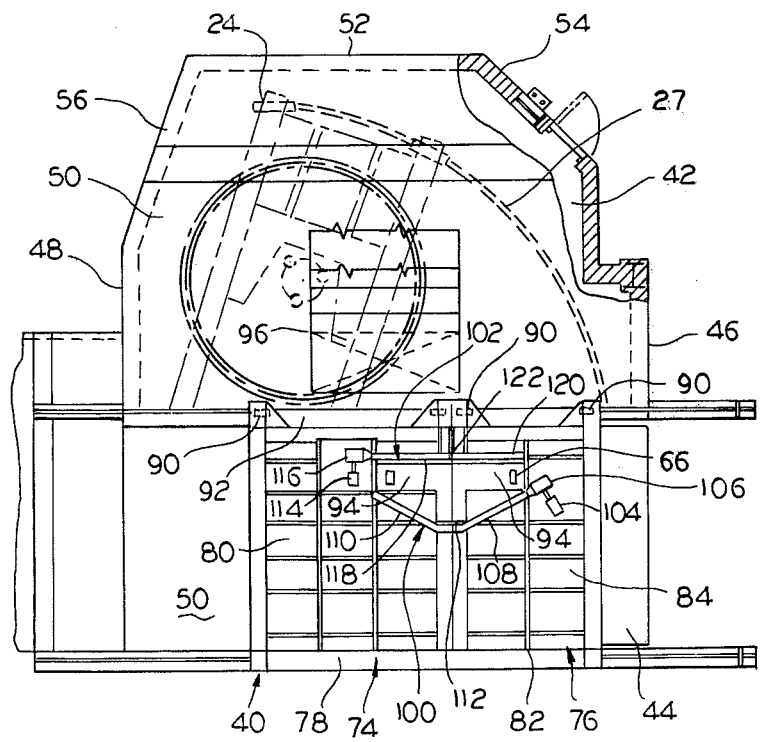
FIG. 3 is a top plan view of the enclosure illustrated in FIG. 1.

As seen in FIGS. 1 and 3, enclosure 10 includes a main bay 40 in which the arc furnace 12 is disposed and which is generally rectangular in plan view as shown in FIG. 3. In addition, an auxiliary bay 42 is disposed adjacent the main bay 40 for receiving the gantry 24 and the roof 20 when the latter are moved away from the furnace body 16. Main bay 40 is defined by a front wall 44 and side walls 46 and 48 which extend rearwardly from the front wall 40. A roof 50 is disposed at the upper end of the front and side walls 44, 46 and 48. It will be appreciated that before the electrodes 22 and the roof 20 are swung to their position shown by broken lines in FIG. 1, the electrodes 22 must be elevated so that their lower ends will not engage the furnace body 16 as they are being swung. The position of the electrodes 22 when so elevated are shown by broken lines in FIG. 1. It will be appreciated, that the height of the roof 50 will be greater than the highest expected elevation of the upper ends of electrodes 22. The auxiliary bay 42 is formed by a continuation of the side walls 46 and 48, the roof 50 and a rear wall 52. Because the rear portion of the auxiliary compartment 50 is only required to receive a portion of the gantry 24, rear wall 52 may be shorter and narrower that front wall 44. As a result, the rear wall 52 is interconnected with the side walls 46 and 48 by diagonal wall portions 54 and 56 to the roof by slanted wall portion 58 and a short vertical wall section 60. It will be appreciated by those skilled in the art that the walls 44, 46, 48, 52, 54, 56, 58, 60 and the roof 50 may be formed of any suitable masonry and structural steel members and include a noise deadening interior surface configuration.

It will be appreciated that furnace 12 will initially receive a metallic charge in the form of scrap metal, hot metal or a combination of the two. During such charging operations, the roof and electrodes are swung to their position shown by broken lines in FIG. 1. The metallic charge is then delivered through the open upper end of the furnace body 16 by any suitable means such as by a charging bucket 62 which is suspended from an overhead crane 64 by means of a pair of hooks 66 which engage trunnion pins 68 extending laterally from the opposite sides of the charging bucket 62.

In order to permit the entry of the charging bucket 62 into the main bay 40, enclosure 10 is provided with openings 70 and 72 in the front wall 44 and the roof 50, respectively. The openings 70 and 72 form a continuous gap in the roof and side walls and have an elevation approximately equal to that of the upper end of furnace body 16 and being of sufficient width and extent to permit the entrance and exit of the ladle 62 into the main bay 40 and rearwardly to a position above the furnace body 16.

Figure 2:
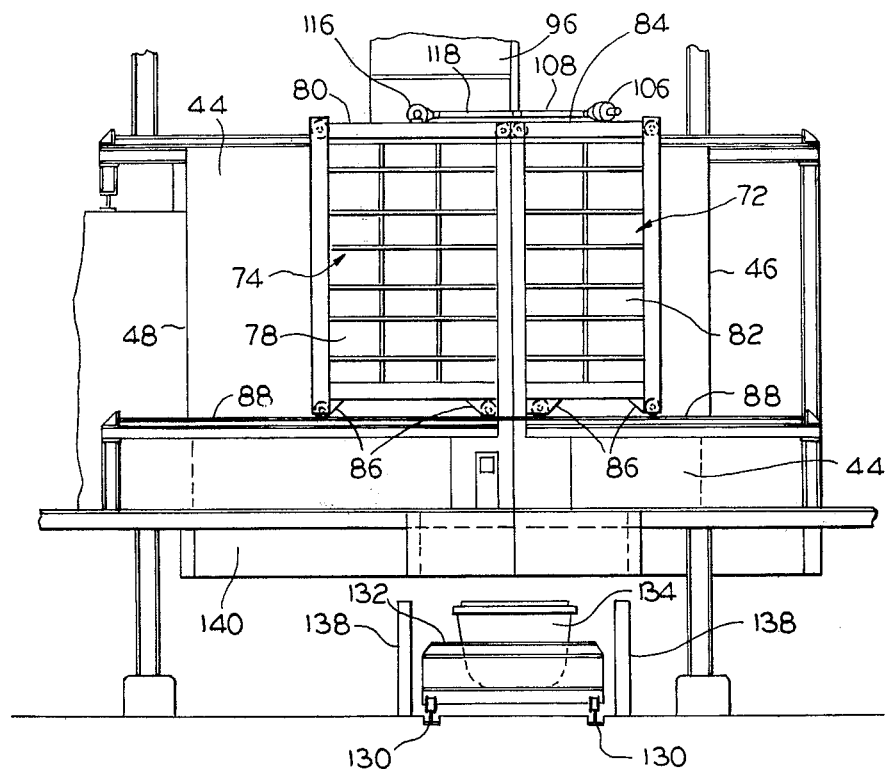
FIG. 2 is a front view of the enclosure illustrated in FIG. 1.

The openings 70 and 72 are normally closed by a pair of doors 74 and 76. Door 74 includes a vertical panel 78 and a top panel 80 extending rearwardly from the upper end of panel 78 in a generally perpendicular relation. Similarly, door 76 includes a front panel 82 and a top panel 84 which respectively lie in the same planes as panels 78 and 80 of door 74. Except as will be noted below, the panels 78, 80, 82 and 84 are sized such that when in their closed position shown in FIG. 2, they cover the openings 70 and 72.

Disposed at the lower ends of panels 78 and 82 are pairs of rollers 86 which engage horizontally extending aligned rails 88 which are supported in a suitable manner adjacent the front wall 44 of enclosure 10 and being substantially parallel thereto and at an elevation substantially equal to the lower edge of opening 70. A second pair of rollers 90 are disposed at the rear edges of panels 80 and 84 for engaging horizontally extending rail 92 which is mounted in roof 50 adjacent the rear edge of opening 72 and in a general parallel relation to rails 88.

Figure 4:
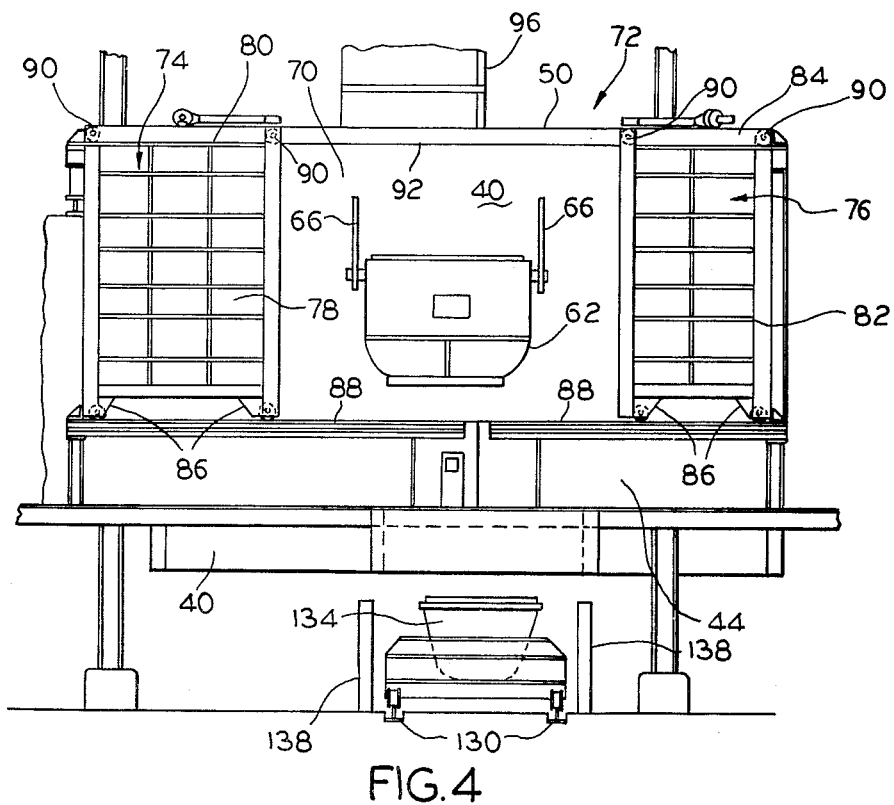
FIG. 4 is a front elevational view of the enclosure illustrated in FIG. 1 and with the access doors open.

As seen in FIG. 3, there is a generally L-shaped opening 94 in each of the top panels 80 and 84 and adjacent their inner and rear edges. When the doors 76 and 78 are closed, the openings 94 are in registry to provide a generally T-shaped opening positioned generally above the central portion of the furnace body 16. The opposite ends of the openings are spaced a distance slightly greater than the spacing between the ladle hooks 66. It will be appreciated, that in order to permit entry of the ladle 62 into the main bay 40, the doors 76 and 78 are opened as shown in FIG. 4. Once the ladle 62 has been positioned above furnace body 16, the doors 76 and 78 may then be closed with the openings 94 permitting the ladle hooks 66 to extend therethrough. The doors 76 and 80 may be moved between their open and closed positions shown in FIGS. 2 and 4 in any suitable manner well known in the art such as drive motors, cables and pulleys.

Vent 96 is connected by a suitable conduit 98 to a suction fan (not shown). The suction fan is sized to create a slight vacuum within the enclosure 10 so as to exhaust smoke and other gases which may discharge from furnace 12.

In order to prevent the escape of smoke and other gases from the openings 94 in door top panels 80 and 84, a pair of air curtain systems 100 and 102 are provided. System 100 includes a drive motor 104 coupled to a blower 106 whose discharge end is connected to a pipe 108 having perforations which are oriented toward opening 94. A second pipe 110 is mounted on the upper panel 80 and has a slide coupling 102 constructed and arranged for receiving the end of pipe 108 when the doors 76 and 78 are in proximity. Pipe 110 similiarly has apertures oriented toward opening 95. The second air curtain system 102 similarly includes a drive motor 114, a blower 116 and a pipe 118 mounted on door panel 80. A second pipe 120 is mounted on panel 82 of door 78, 122 adapted to engage the end of pipe 118. Pipes 118 and 120 both have apertures oriented across openings 94 and 95. It can be seen that when the air curtain assemblies 100 and 102 are in operation, high pressure air will be blown across openings 94 and 95 to effectively seal the same against the egress of smoke and gases. Accordingly, when the ladle 62 is in main bay 40 with the doors 76 and 78 closed and the air curtain systems 100 and 102 in operation, the upper end of the enclosure 10 is sealed even though the hooks 66 extend through openings 94 and 95.

Disposed generally below the platform 18 are a pair of rails 130 for receiving a ladle car 132. This permits the positioning of a ladle 134 below the pouring spout 136 of furnace 12. Accordingly, when a teaming operation is to be performed, the vessel 12 is tilted between its position shown by full lines in FIG. 1 to its position shown by broken lines whereby molten metal may be poured into ladle 134. As a result, a relatively large open space is provided below enclosure 10. In order to minimize the amount of ambient air drawn into the vessel and to permit the capture of gases and smoke released during such a pouring operation, a pair of vertical baffle walls 138 are provided below platform 18 and in general parallelism with tracks 130. In addition, a skirt 140 extends downwardly from the main floor 28 generally above the walls 130 and extending forwardly and rearwardly of the walls 138.

In an arc furnace of the type illustrated, the electrodes 22 are commonly of graphite and consist of short cylindrical sections joined end-to-end by screw couplings. When a sufficiently large portion of the electrodes' lower end has been consumed, it is necessary to add a new electrode section at the upper end and to slip the electrode downwardly relative to its support clamp (not shown). This required that access be available to the electrodes from above to permit the electrode sections to be lowered into position by means of the crane 64 or other suitable apparatus. The sliding doors 76 and 78 permit such access.

Figure 5:
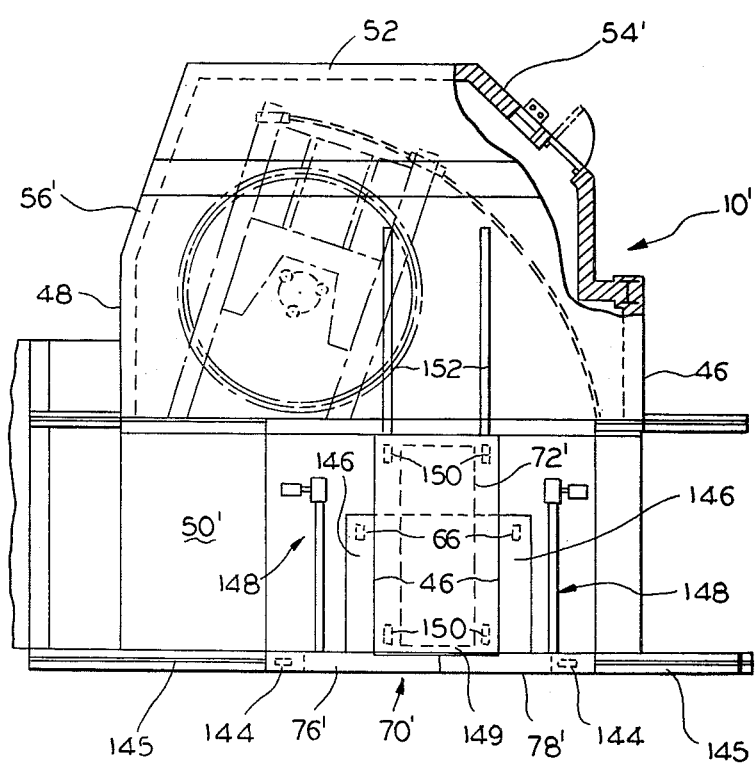
FIG. 5 is a top plan view of an alternate embodiment of the invention.

FIG. 5 shows an alternate embodiment of the invention which also permits electrode access and roof sealing during charging. Specifically enclosure 10' includes doors 76' and 78' consisting of vertical panels only, each of which is supported at its lower end in the same manner as the embodiments of FIGS. 1-4. In addition, the upper ends of the doors 76' and 78' are provided with rollers 144 which individually engage one of a pair of spaced apart, alligned rails 145 suitably mounted at the upper end of the enclosure front opening 70'. A pair of slots 146 are formed in roof 50 in general parallelism with each other and perpendicular to the front opening 70'. The slots 146 permit the passage of the ladle hook 66 when the ladle 62 is moved through opening 70' and into the enclosure 10. The gap between the ends of rails 145 is greater than that between the outer edges of slots 146 to permit passage of hooks 66. Disposed adjacent each of the slots 146 are air curtain devices 148 each oriented to discharge air across the openings 146 to effectively seal the same.

In order to permit substantial closure of top opening 72', except for slots 146, a rectangular door 148 is mounted on roof 50 by means of rollers 150 and rails 152. One of the rollers 150 is mounted at each corner of and beneath door 148 and the rails 152 extend above side of and rearwardly of opening 72'. The embodiment of FIG. 5 permits the top opening 72' to remain substantially closed during movement of the bucket 62 into and out of enclosure 10' to minimize the escape of smoke and gases. Door 148 need be opened only when access to the electrodes is required.

While only a few embodiments of the invention have been illustrated and described, it is not intended to be limited thereby but only by the scope of the appended claims.

I claim:

1. An enclosure for a tiltable electric arc furnace having a furnace body and a cover swingable from a position above the furnace body to a remote position to permit the charging of materials into said furnace body, electrode means extending through said cover and swingable therewith, said enclosure including:

front, side and rear walls and a roof, a tiltable platform within said enclosure and disposed adjacent said front wall for supporting said furnace, said furnace roof being adjacent said rear wall in its remote position, a first opening in said front wall to permit the movement of a charging vessel into and out of said enclosure, a second opening in said roof above said furnace body and exposing a major portion of said furnace body and cover to permit the passage of ladle support means into and out of the enclosure, said second opening also permitting access to furnace electrodes and associated circuitry, door means for closing said first and second openings, means for supporting said door means for movement between a closed position relative to said openings and an open position wherein said openings are exposed, said door means including a vertical portion for closing said first opening and a generally horizontal top portions for covering a major portion of said second opening, said top door portion being shaped such that when it is in its closed position a third opening is defined above said furnace to permit a ladle support means to extend therethrough when said door means is closed, and air curtain means disposed adjacent said third opening for directing air thereacross for sealing the same, and vent means opening into said enclosure roof for removing gases therefrom.

2. The enclosure set forth in claim 1 wherein there are a pair of doors each having vertical and top portions, said doors being movable in opposite directions and away from said openings, the top portions of said doors each have an edge proximate to the other when in a closed position, and a gap formed in each of said proximate edges to define the third opening.

3. The enclosure set forth in claim 1 wherein said vertical and top door portions are separately movable, said ladle support means comprising a pair of spaced apart members movable in a first direction into said enclosure, said top door portion being movable in the same direction as said ladle supports and having a width less than the distance between said supports, movement of said top door into its closed position placing said top door portion between said ladle supports to define a pair of elongate, spaced apart, parallel slots in the roof and opening into said front wall opening, said front door portion being movable perpendicularly to said slots.

4. The combination set forth in claim 2 wherein a skirt extends downwardly from said enclosure and on the side thereof opposite the front opening, said skirt defining a pouring position toward which said electric arc furnace tilts and below which a ladle may be positioned to receive molten metal discharged during furnace tilting, and evacuating means connected to the top of said enclosure and generally above said skirt for evacuating fumes released during a pouring operation.

* * * * *